United States Patent [19]

Ferfecki

[11] Patent Number: 4,581,000

[45] Date of Patent: Apr. 8, 1986

[54] LOAD BLOCK FOR CHAIN-BELT

[75] Inventor: Frank J. Ferfecki, Riverside, Ill.

[73] Assignee: Borg-Warner Corporation, Chicago, Ill.

[21] Appl. No.: 645,190

[22] Filed: Aug. 29, 1984

[51] Int. Cl.$^4$ .......................... F16G 1/00; F16G 1/21
[52] U.S. Cl. .................................... 474/201; 474/242
[58] Field of Search ....................... 474/201, 242, 272

[56] References Cited

U.S. PATENT DOCUMENTS

| | | | |
|---|---|---|---|
| 3,720,113 | 3/1973 | Van Doorne et al. | 474/242 |
| 4,313,730 | 2/1982 | Cole, Jr. et al. | 474/201 |
| 4,386,922 | 6/1983 | Ivey | 474/201 X |

FOREIGN PATENT DOCUMENTS

| | | | |
|---|---|---|---|
| 2414989 | 10/1975 | Fed. Rep. of Germany | 474/201 |
| 712876 | 10/1931 | France | 474/201 |

Primary Examiner—John M. Jillions
Assistant Examiner—Katherine Matecki
Attorney, Agent, or Firm—James A. Geppert

[57] ABSTRACT

A load block for a metal chain belt comprising upper and lower transverse struts, the ends of which are adapted to engage the flanges of the pulleys of a pulley transmission, said struts being joined by recessed end portions, the struts and end portions defining a window for encircling a carrier, the end portions being recessed from the ends of said struts so as not to engage the flanges of the pulleys of a pulley transmission.

4 Claims, 5 Drawing Figures

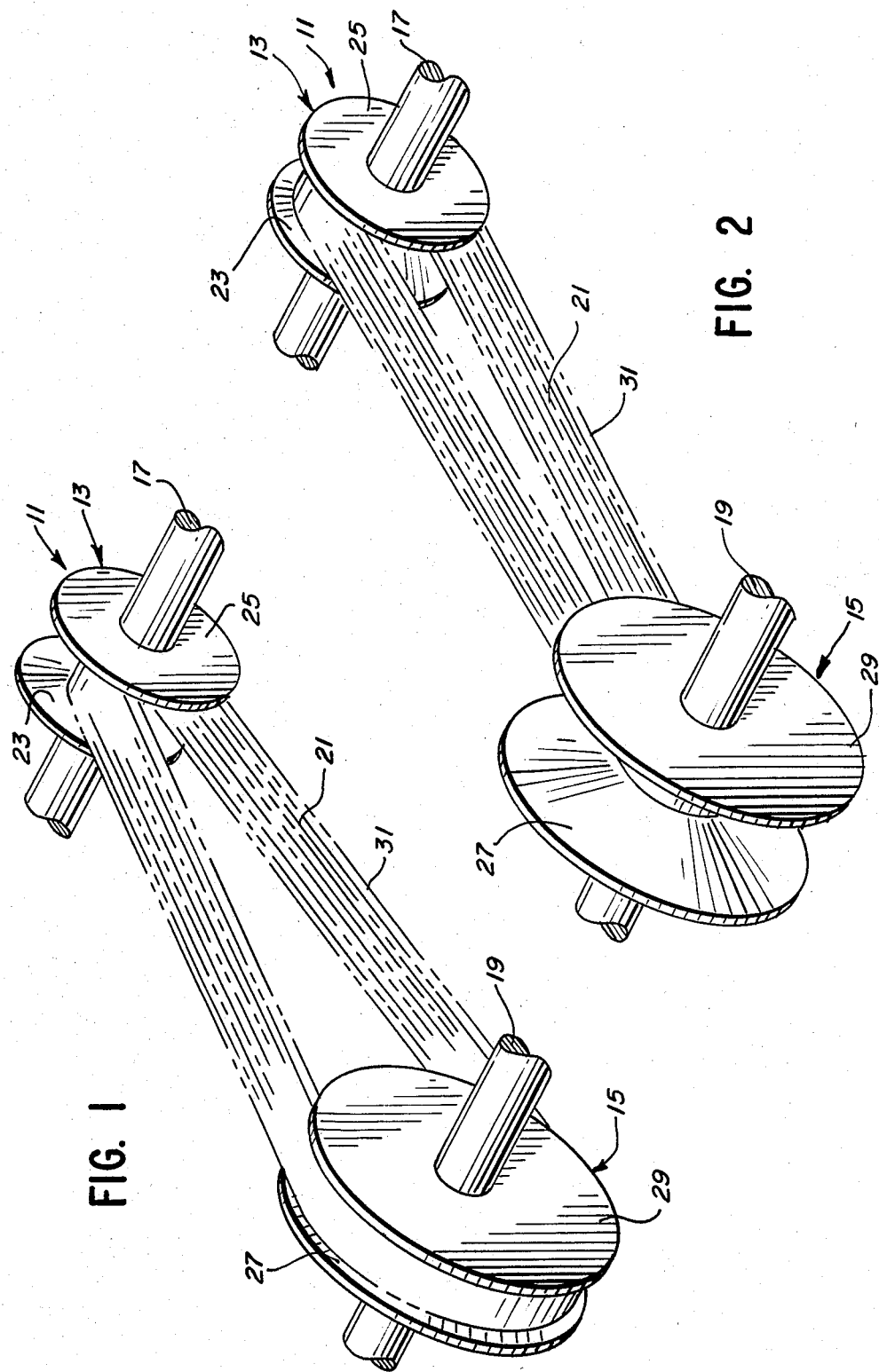

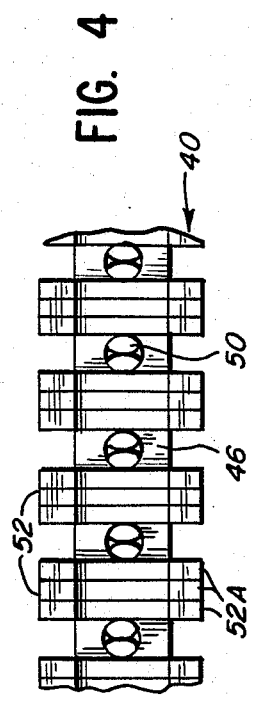
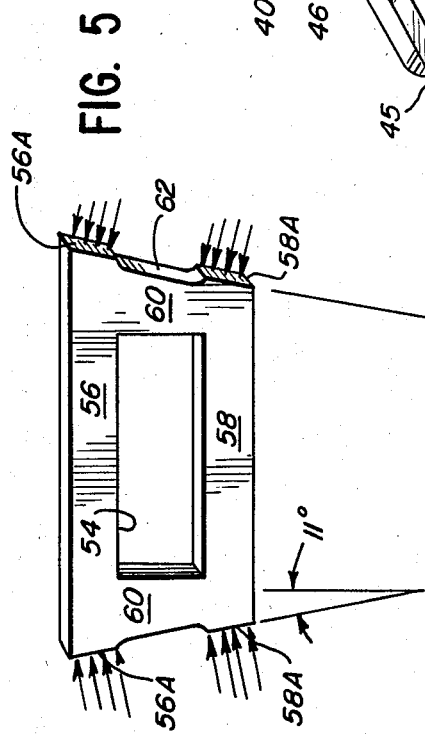
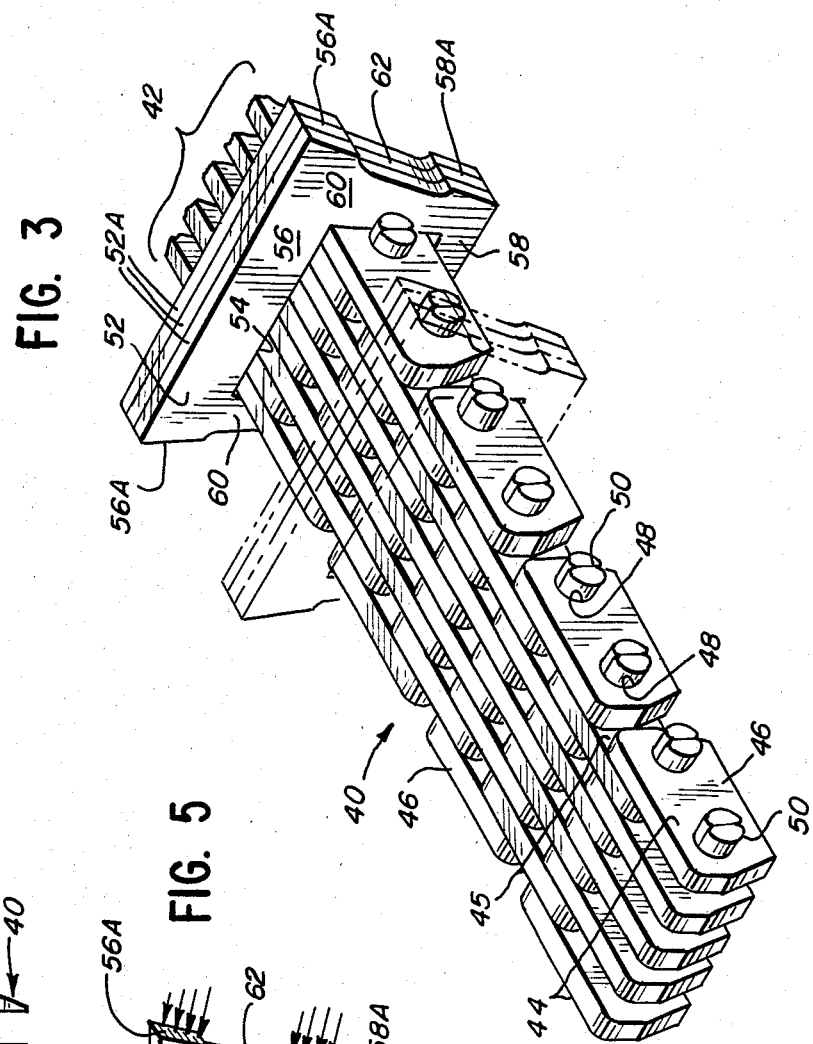

LOAD BLOCK FOR CHAIN-BELT

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed and, simultaneously, the effective diameter of the other pulley is changed in the opposite direction, the drive ratio between the input and output shafts is adjusted in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This has not been possible when a conventional geared transmission is teamed with an engine. In the conventional geared transmission, the drive ratio is adjusted in discrete steps, rather than continuously. Accordingly, efforts have been directed to the use of a continuously variable transmission (CVT) of the type described above. These efforts have resulted in the production and marketing in Europe of the Daf passenger car, using a flexible, continuous rubber belt to drivingly interconnect the pulleys. Such a belt is subject to wear by reason of the torque it must handle and operates under severe temperature, vibration and other adverse conditions. To improve the belt life, efforts have been channeled to produce a flexible belt of metal, and some of these efforts are described in the patent literature.

Flexible metal belts for use with CVTs are generally of two varieties, those referred to as "push" belts and those referred to as "pull" belts. An example of a push belt is described in Van Doorne et al U.S. Pat. No. 3,720,113, and an example of a pull belt is described in Cole, Jr. et al U.S. Pat. No. 4,313,730. The Van Doorne et al belt comprises an endless carrier constructed of a plurality of nested metal bands, and an endless array of load blocks longitudinally movable along the carrier. Each block has edge surfaces for frictionally engaging the pulley flanges of a pulley transmission to transmit torque between the pulleys. The pull belt of Cole, Jr. et al utilizes an endless chain as the carrier, the sets of links of which are pivotally interconnected by pivot means, shown as round pins. Generally trapezoidal (when viewed from the front) load blocks encircle the links; however the load blocks are constrained against longitudinal movement along the chain by the pivot means.

The push belt as described is relatively expensive to manufacture because the nested carrier bands are precisely matched to each other. Such a belt must be installed and/or replaced as a complete, endless loop, and thus disassembly of parts of the pulley transmission is required, not only for the initial assembly, but also for replacement due to failure of one or more load blocks or one or more of its carrier bands.

The pull belt offers a less expensive alternative to the push belt. No precise matching of carrier parts is required. The belt can be assembled with a finite length, positioned around the pulleys, and the ends then connected by a pivot member. Thus disassembly of the pulleys is not required either for initial installation or for replacement of a belt.

Load blocks for use with either carrier system have been constructed with generally flat, planar, pulley-flange-engaging surfaces. The generally flat pulley engaging surfaces are, at times, joined to the top and bottom surfaces of the blocks by curved surfaces of small radii which have no effect on block-pulley contact. In current designs of load blocks, the load is applied to their planar edges and is transmitted through the edge positions which are placed in tension due to bending. When the tension forces are sufficiently high, failure of the blocks occurs.

SUMMARY OF THE INVENTION

To avoid high tensile forces in the edge portions of load blocks due to the load thereon caused by pulley engagement, an improved load block is provided which shows calculated stress reductions of about 50% in the edge portions when compared to standard, prior art load blocks. The improved load blocks appear, at least at first glance, similar to conventional load blocks; however, a portion of each edge surface of a load block is undercut and does not contact the pulley flanges. Generally the undercut portion abuts at least one of the projections of the upper and lower transverse strut portions of each load block. Thus, the load applied by the pulley flanges is generally in line with a transverse strut portions, reducing bending stress in portions of the load blocks and also improving the strength and life of load blocks usable in the noted environment.

BRIEF DESCRIPTION OF THE DRAWINGS

FIGS. 1 and 2 are schematic illustrations of a continuously variable transmission (CVT) in two, extreme drive ratios;

FIG. 3 is an isometric illustration of a portion of a chain-belt constructed according to this invention;

FIG. 4 is a side view of a portion of the chain-belt of FIG. 3; and

FIG. 5 is an isometric view of a load block plate constructed according to this invention and illustrated as a part of the chain-belt of FIG. 3.

DETAILED DESCRIPTION OF THE PREFERRED EMBODIMENT

FIGS. 1 and 2 illustrate a variable pulley transmission 11 comprising a pair of pulleys 13 and 15 connected respectively to shafts 17 and 19, the pulleys being drivingly connected by a belt means 21. Pulley 13 comprises flanges or sheaves 23 and 25 and pulley 15 comprises flanges or sheaves 27 and 29. The sheaves of flanges are generally conical and are engaged by the tapered edges 31 of the belt means 21. At least one flange of each pulley is axially movable with respect to the other, so as to provide the stepless drive ratios between the shafts, one of which is a drive shaft and the other a driven shaft.

FIGS. 3 and 4 illustrate a segment of a chain-belt 40 which comprises an endless carrier 42, constructed of a plurality of sets 44 and 45 of links 46, the adjacent sets of which are interleaved with one another or laced together. The carrier 42 functions as a tension member for the chain-belt. The sets 45 of links 46 have one less link than the sets 44. Each link 46 has a pair of spaced apertures 48 adjacent its ends with one of the apertures in one set of links transversely aligned with one of the apertures in the adjacent set of links, so as to receive a pivot means 50 which joins the adjacent sets and permits articulation thereof. The pivot means 50 can be round pins or pins and rockers, as known in the chain art. Here a pin and rocker joint is illustrated.

Between each successive pivot means, a load block assembly 52 is provided. Each load block assembly encircles the chain, being provided with a window 54 for that purpose. Each block assembly can be constructed of a single block member or a plurality of thinner plates 52A, one of which is shown in FIG. 5. The use of plates 52A permits their manufacture by a stamping procedure from metal sheet as opposed to machining each block assembly from thicker stock material. The function of each block is the same regardless of whether it is a single member or a multi-plate assembly.

Each load block 52 or a plate 52A thereof, in addition to the window 54, comprises a top transverse strut portion 56, a bottom transverse strut portion 58, and a pair of side or edge portions 60. As thus described, each load block is substantially the same as those described in the aforesaid Cole et al patent, supra. However, unlike the prior art load blocks and particularly in accordance with the present invention, the edge portions 60 are contoured, so that a generally central segment or portion 62 is "undercut", i.e., it does not contact the pulley flange when wrapping the pulley. The top and bottom transverse strut portions 56, 58 extend laterally beyond the edge portions 60, and the vertical dimension of the window is substantially coextensive with the undercut central portions 62 of the edge portions 60. Thus, the sheave loads (as indicated by the arrows in FIG. 5) are applied to each block at the surfaces 56A, 56A, 58A, 58A in line with the top and bottom struts 56 and 58; the undercut side or edge portions 60 do not receive any load and are not stressed in tension due to lateral bending. The modified load block is relatively simple to produce, requiring only a die for the metal stamping operation. For blocks machined out of blocks of metal, some additional machining, i.e., the undercutting of the edges, is necessary. It is also possible to modify existing chain-belts using the prior art load blocks by machining the load blocks, so that they follow the teaching of this invention.

The following claims are intended to cover all reasonable equivalents of the described structure.

I claim:

1. A power transmission chain-belt adapted to drivingly connect the pulleys of a pulley transmission, the pulleys of which are each constructed of a pair of generally conical flanges, said chain-belt comprising:
    a plurality of sets of links, the next adjacent sets of which are interleaved with one another;
    pivot means joining the next adjacent sets together and permitting adjacent sets to articulate with respect to one another; and
    a plurality of load blocks each encircling a set of links, said load blocks being generally trapezoidal in shape when viewed from the front and having tapered edge edge portions for engaging pulley flange, each load block being constructed to have upper and lower transverse strut portions joining the edge portions and defining a window bounded thereby, said edge portions having a central segment substantially coextensive with the vertical dimension of the window which is undercut so as to be free of driving contact with the pulley flanges.

2. A power transmission chain-belt as claimed in claim 1, in which the undercut central segment of each of said edge portions acts to effect application of the sheave loads to each load block in line with said upper and lower transverse strut portions.

3. A load block for a power transmission belt adapted to drivingly connect the pulleys of a pulley transmission, each pulley of which is constructed of at least one generally conical flange, said load block being adpated to encircle a carrier forming a tension member of said belt, said load block comprising:
    an upper strut portion oriented transversely with respect to said carrier;
    a lower strut portion oriented transversely with respect to said carrier; p1 said upper and lower strut portions each having edge portions for engaging said pulley flanges;
    spaced end portions joining the upper and lower struts inwardly of said edge portions so as to be free of engagement with said pulley flanges; and
    a window defined by said strut portions and end portions for encircling said carrier.

4. A power transmission chain-belt adapted to drivingly connect the pulleys of a pulley transmission, the pulleys of which are each constructed of a pair of generally conical flanges, said chain-belt comprising:
    a plurality of sets of links, the next adjacent sets of which are interleaved with one another;
    pivot means joining the next adjacent sets together and permitting adjacent sets to articulate with respect to one another; and
    a plurality of load blocks each encircling a set of links, said load blocks being generally trapezoidal in shape when viewed from the from and having edge portions for engaging pulley flanges, each load block being constructed to have upper and lower transverse strut portions joining the edge portions, said edge portions each having a segment which is undercut so as to be free of driving contact with the pulley flanges, the edge portions not undercut being in line with a transverse strut portion.

* * * * *

UNITED STATES PATENT OFFICE
CERTIFICATE OF CORRECTION

PATENT NO. : 4,581,000
DATED : April 8, 1986
INVENTOR(S) : FRANK J. FERFECKI

It is certified that error appears in the above-identified patent and that said Letters Patent are hereby corrected as shown below:

Column 4, line 30, cancel "pl" (paragraph sign) and begin new paragraph with phrase -- said upper and lower strut --.

Signed and Sealed this

Twenty-ninth Day of July 1986

[SEAL]

Attest:

DONALD J. QUIGG

Attesting Officer

Commissioner of Patents and Trademarks